Patented Sept. 8, 1925.

1,552,431

UNITED STATES PATENT OFFICE.

HUGO GRÖNROOS, OF COPENHAGEN, DENMARK.

PROCESS FOR MANUFACTURE OF BUILDING MATERIALS OR THE LIKE, SUCH AS BUILDING STONE, ROOFING TILES OR SLABS, WALL-COVERING PLATES, PARTITION BLOCKS, AND THE LIKE.

No Drawing.   Application filed March 6, 1923.   Serial No. 623,303.

*To all whom it may concern:*

Be it known that I, HUGO GRÖNROOS, a citizen of the Republic of Finland, residing at Copenhagen, Amagergade 20, in the Kingdom of Denmark, have invented new and useful Improvements in Processes for Manufacture of Building Materials or the like, Such as Building Stone, Roofing Tiles or Slabs, Wall-Covering Plates, Partition Blocks, and the like, of which the following is a specification.

The present invention relates to a process for manufacture of building materials or the like, such as building stone, roofing tiles or slabs, wall covering plates, partition blocks, flags and the like. According to the invention, these materials are produced from a mixture consisting mainly of refuse products entering into the mixture for the various building materials in various proportions and, partly, in various fineness. In the manufacture of the various kinds of materials the procedure is that the substances which are to enter into the mixture are first powdered more or less, then mixed in dry state, then moistened so far that the mass may be moulded into the shape of either stone or plates and the like, the moulded mass being then exposed to a heavier or lighter pressure, depending on the articles having to be shaped as plates or building blocks, and being finally burnt in a kiln for a suitable time and at a suitable temperature.

The substances from which the mixture is composed are slags (or other ferruginous substance, such as lava or iron ore) glass refuse, clay, oxide or iron, salpeter and quartz.

In finer or coarser pulverized state the slags form partly a filling partly a binding agent, and they enable furthermore the finished product to become porous and sufficiently elastic to allow the manufacture of large plates without cracks appearing in the same, and perfectly plane.

The glass refuse is used in finely powdered state, and is slightly fused together with the slags during the burning process and act, thereby, as an insulation for the entire mass, so that water and moisture will have no injurious effect on the iron contents of the slags.

The clay serves partly as filler partly as binder during the manufacture of the mass.

The addition of salpeter is used in order to attain a more intimate combination of the slags and the glass refuse during the burning process.

In the manufacture of building blocks the mixing proportion is most suitably the following:

About 400 kg. slags (or the like), about 100 kg. glass refuse, about 100 kg. clay about 1 kg. oxide of iron, about 5 kg. salpeter and, about 2 kg. quartz.

Slags, glass refuse and clay are first pulverized separately in a suitable crushing mill with controlling screen, so that each substance acquires the desired fineness.

All the substances belonging to the mixture are then carefully mixed together in a mixing machine. When the mixture is finished, water is added by sprinkling in such quantity that the mass becomes coherent, for instance when compressed in the hand. For the above mentioned quantity of the mixture about 10 kg. of water will be required.

The mass thus produced is now introduced into a revolving press in which it is moulded into the shape of building blocks, for instance of the same size as ordinary bricks, the moulded units being exposed to a pressure of about 50 kg. per square centimeter. From the press the moulded units are directed immediately into a suitable burning kiln constructed most suitably in such a manner that the units may be inserted at one end and removed from the opposite end.

Outside of the kiln the blocks are placed on a frame which is pushed into the kiln, and on which the blocks remain during the burning process. The latter is performed first for about 30 minutes at a temperature of about 300° C. During this period of the process, the water is evaporated from the blocks. Then the temperature of the kiln is increased to about 740° C., and at this temperature the elements are burnt further for about 30 minutes. The burning is then finished, and the blocks are then removed from the kiln, and are ready for use at once after cooling.

Owing to the short period of burning, relatively small kilns may be used, for instance of such a size that about 200 blocks may be burnt at a time. Such kilns are cheap to operate, and require only small space. The kiln is suitably built as a double kiln with two kiln chambers alongside of one another with a furnace disposed between them. While burning is going on in one of the kiln chambers, the other one may be emptied and filled again, and between the furnace and each kiln chamber dampers may be provided in such a manner that the combustion gases may be directed solely to the compartment of the kiln in which burning is performed.

In the manufacture of partition blocks or plates the procedure is essentially the same as above described.

In the manufacture of roofing plates or tiles, plates for window sills, wall covering or the like the mixing proportion is essentially the same as indicated above, but the slags are powdered more finely, and the molded units are exposed to a pressure of up to 150 kg. per square centimeter.

In the production of sidewalk flags or slabs the substances enter in different proportion of mixture than the one mentioned above, namely:

About 100 kg. of slags, about 400 kg. of glass refuse, about 100 kg. of clay, about 1 kg. of oxide of iron, about 5 kg. of salpeter, about 2 kg. of quartz.

The treatment and burning are otherwise as described above, while the pressure used is about 200 kg. per square centimeter.

The advantages of the invention are that the materials according to the said invention may be produced easily and quickly as well as cheaply, that the mass may be pressed into blocks or plates which will stand the transport from the press to the kiln, that the time will be saved which would otherwise be used for drying or hardening, and that hereby the construction of drying sheds or the like will be avoided, and that burning requires only very short time, and may be performed in small and cheap kilns and, consequently, becomes very economical.

The excellent proportions of the material enabling the same to be substituted for all previously known materials for the same purpose, because this material, besides possessing all the advantages of the other materials, is far cheaper than these and is free of the defects inherent in all other substitute materials, are due partly to the composition of the material, partly to the burning process.

Having thus described my invention, what I claim is:—

1. A method for manufacture of building materials or the like, such as building blocks, roofing tiles or plates, wall covering plates, partition blocks or plates or the like, consisting in mixing together a pulverized ferruginous material, pulverized glass refuse, pulverized clay, oxide of iron, salpeter and quartz, adding water to the mixture, moulding the said mixture in moist state as units of the desired shape and subjecting said units to a pressure and heat.

2. A method for manufacture of building materials or the like, such as building blocks, roofing tiles or plates, wall covering plates, partition blocks or plates or the like, consisting in mixing together about 400 kg. of slags, about 100 kg. of glass refuse, about 100 kg. of clay, about 1 kg. of oxide of iron, about 5 kg. of salpeter and about 2 kg. of quartz, adding water to the mixture, moulding said mixture as units of the desired shape under a pressure of 50 to 200 kg. per square centimeter, and burning first at a temperature of about 300° C. for about half an hour and then at about 740° C. for about another half hour.

3. A method for manufacture of building materials or the like, such as building blocks, roofing tiles or plates, wall covering plates, partition blocks or plates or the like, consisting in mixing about 400 kg. of slags, about 100 kg. of glass refuse, about 100 kg. of clay, about 1 kg. of oxide of iron, about 5 kg. of salpeter and about 2 kg. of quartz, adding water to the mixture, moulding said mixture as units of the desired shape under a pressure of about 150 kg. per square centimeter, and burning first at a temperature of about 300° C. for about half an hour and then at about 740° C. for about another half hour.

In testimony whereof I have signed my name to this specification.

HUGO GRÖNROOS.